N. E. MEREDITH.
VALVE GRINDER.
APPLICATION FILED MAR. 17, 1914.
1,104,210.
Patented July 21, 1914.
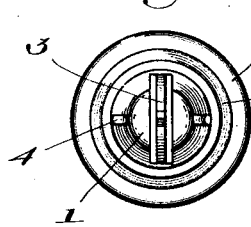
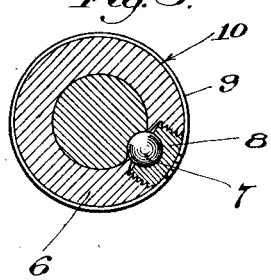
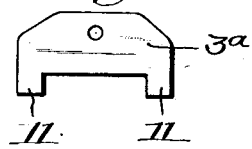
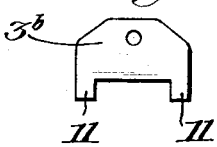
Witnesses:
Inventor:
Noah E. Meredith

UNITED STATES PATENT OFFICE.

NOAH E. MEREDITH, OF LOS ANGELES, CALIFORNIA, ASSIGNOR OF FORTY-NINE ONE-HUNDREDTHS TO JOHN F. WALSH, OF LOS ANGELES, CALIFORNIA.

VALVE-GRINDER.

1,104,210.  Specification of Letters Patent.  Patented July 21, 1914.

Application filed March 17, 1914. Serial No. 825,260.

*To all whom it may concern:*

Be it known that I, NOAH E. MEREDITH, a citizen of the United States, residing at Los Angeles, in the county of Los Angeles and State of California, have invented a new and useful Valve-Grinder, of which the following is a specification.

This invention relates to a valve grinder adapted for grinding the valves of internal combustion engines, and the object of the invention is to provide a tool for this purpose which is of extremely simple construction which will be very durable and which will effectually operate.

In carrying out my invention I produce the desired progressive oscillatory movement of the valve by a reciprocating element which is manually moved along a shank, the action being such that during the down stroke of said element the shank is given a succession of oscillations which at the end of the stroke have resulted in turning the shank through a complete revolution and during the return stroke of the operating element the shank is turned by a succession of oscillatory movements with a general progression in the opposite direction, so that at the conclusion of the stroke the shank will have been turned backward a complete revolution.

Referring to the drawings: Figure 1 is a side elevation of the tool. Fig. 2 is a view looking at the lower end of the tool. Fig. 3 is an enlarged cross section on line $x^3$—$x^3$, Fig. 1. Figs. 4 and 5 are another form of valve key.

The tool comprises a shank 1 at the upper end of which is swiveled a hand knob 2 for steadying the upper end of the tool, and at its lower end the shank is provided with a pointed blade 3 detachably pivoted by a cotter pin 4 and adapted to engage the slotted head of the valve not shown, the pivotal mounting of the blade 3 enabling it to remain seated in the slot of the valve without being dislodged if the shank is not held exactly in line. The shank is provided with a wavy groove 5, having a general longitudinal direction and with a progressive general spiral direction, thus starting at the top of the shank as shown in Fig. 1, the wavy groove 5 has a gradual progressive position toward the left and the lower end thereof is on the same side from which the groove starts at the top. There is thus a general spiral forward direction of the groove with intermediate recessions.

Slidable on the shank 1 is an operating member in the form of a sleeve 6, which is preferably gnarled as shown, to give a secure grip for the hand. A ball 7 is retained loosely within the sleeve by means of a screw plug 8 in such a way that the ball engages constantly in the wavy groove 5, whereby as the sleeve 6 is moved longitudinally along the shank 1 and being held by the hand of the operator from turning, an oscillatory movement is imparted to the shank 1 by reason of the waves in the spiral groove 5, and as the sleeve is moved down the shank is given a succession of oscillations giving a gradual progression of the shank circularly counter-clockwise and such that during the complete down stroke of the sleeve the shank will have been turned back and forth several times and yet moved substantially a complete revolution. During the up-stroke of the sleeve 6 the shank is caused to turn a complete revolution in the opposite direction by a series of oscillations. Thus by reciprocating the sleeve the shank is alternately driven in opposite directions by a succession of oscillatory movements, with the result that a corresponding movement is imparted to the valve which properly grinds the same. The progressive circular movement of the shank is an important feature because each oscillation of the valve is caused to overlap the other which obviates scoring. A spring 9 is fixed in groove 10 on the sleeve 6 to prevent screw plug 8 from slipping.

In the form of blade shown in Fig. 4, the blade member 3ª is provided with two projections 11 for engaging with the valve, while in the form shown in Fig. 5, the blade member 3ᵇ is narrower than the blade 3ª, and is provided with two projections 11 for engaging with the valve. Either blade 3ª or 3ᵇ may be connected in the shank 1 in place of the blade 3.

What I claim is:

1. A valve grinder comprising a shank with a spiral groove therein said groove having a plurality of waves and a sleeve slidable along said shank with means engaging said groove to oscillate the shank as the sleeve is moved in one direction.

2. A valve grinder comprising a shank adapted to engage the valve, said shank having a longitudinal wavy groove, the said groove having a general spiral direction, and a sleeve slidable on the shank with means engaging in said groove.

3. A valve grinder comprising a shank adapted to engage the valve, said shank having a spiral wavy groove, a sleeve sliding on the shank, and a ball retained in said sleeve engaging in said groove.

4. A valve grinder comprising a shank with a spiral wavy groove, a sleeve slidable on said shank, a ball within said sleeve engaging said groove, and a screw plug in the sleeve retaining said ball in engagement with the groove.

5. A valve grinder comprising a shank with a spiral groove therein said groove having a plurality of waves, a sleeve slidable along said shank with means engaging said groove to oscillate the shank as the sleeve is reciprocated, and a hand knob swiveled on the upper end of said shank.

In testimony whereof, I have hereunto set my hand at Los Angeles, California, this 9th day of March, 1914.

NOAH E. MEREDITH.

In presence of—
Lorrain E. Durrow,
Lora M. Bowers.